United States Patent [19]

Geyer, Jr. et al.

[11] 4,269,973
[45] * May 26, 1981

[54] PROCESS AND APPARATUS FOR MAKING ALKALI CELLULOSE IN SHEET FORM

[75] Inventors: Charles J. Geyer, Jr., Berwyn; Ben E. White, Wayne, both of Pa.

[73] Assignee: Fiber Associates, Inc., Berwyn, Pa.

[*] Notice: The portion of the term of this patent subsequent to Aug. 7, 1996, has been disclaimed.

[21] Appl. No.: 4,302

[22] Filed: Jan. 18, 1979

Related U.S. Application Data

[63] Continuation of Ser. No. 576,200, May 9, 1975, Pat. No. 4,163,840.

[51] Int. Cl.³ ............................ C08B 1/08; C08B 1/10
[52] U.S. Cl. ......................................... 536/101; 8/125
[58] Field of Search ............................ 536/101; 8/125

[56] References Cited

U.S. PATENT DOCUMENTS

| 2,143,863 | 1/1939 | Collings et al. | 536/84 |
| 2,149,178 | 2/1939 | Morton | 536/101 |
| 2,373,374 | 4/1945 | Bierwirth | 536/56 |
| 2,499,010 | 2/1950 | Weeldenburg | 536/101 |
| 2,558,066 | 6/1951 | Wedler | 536/101 |
| 2,614,102 | 10/1952 | Schlosser et al. | 536/101 |
| 2,841,579 | 7/1958 | Villefroy et al. | 536/101 |
| 3,600,379 | 8/1971 | Sihtola et al. | 536/60 |
| 3,728,330 | 4/1973 | Sihtola et al. | 536/60 |
| 3,885,575 | 5/1975 | Parker et al. | 536/2 |

Primary Examiner—Ronald W. Griffin
Attorney, Agent, or Firm—Miller & Prestia

[57] ABSTRACT

Improved process and apparatus for making alkali cellulose comprises continuously steeping indefinite length sheets of cellulose in an alkali hydroxide bath, generally 17–25% sodium hydroxide, and then passing the cellulose strip through a chamber where it is subjected to extremely rapid mercerizing conditions, including an RF energy field, to produce depolymerization thereof. Upon emergence from the steep bath, the cellulose passes to an excess solution removing means, such as one or a series of pairs of nip rolls where the excess solution is expressed from the cellulose and the amount of absorbed alkali is controlled. Preferably, the excess solution is recovered and returned to the steeping baths. A second, lower concentration, steep bath may follow the rapid mercerization step.

6 Claims, 1 Drawing Figure

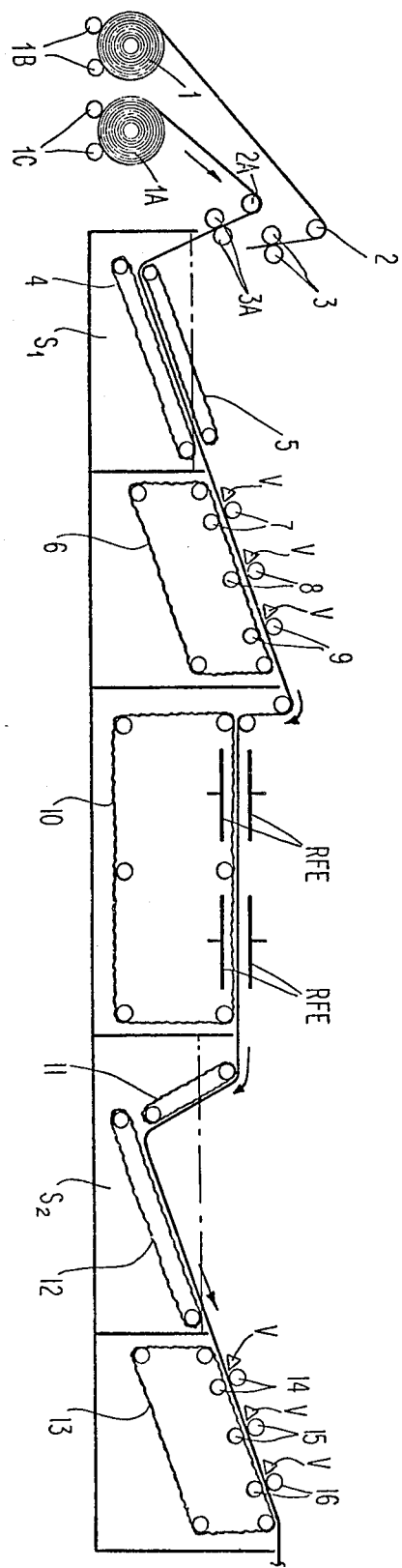

PROCESS AND APPARATUS FOR MAKING ALKALI CELLULOSE IN SHEET FORM

This is a continuation of application Ser. No. 576,200, filed May 9, 1975, now U.S. Pat. No. 4,163,840 issued Aug. 7, 1979.

This invention pertains to improved process and apparatus for producing alkali cellulose as a first manufacturing operation in the production of regenerated cellulose products, such as viscose rayon. This invention pertains more specifically to process and apparatus involving alkali steeping of sheet cellulose in a continuous manner followed by continuous mercerization in sheet form.

A variety of processes and apparatus have been proposed heretofore for steeping cellulose in an alkali hydroxide solution to produce alkali cellulose which is subsequently xanthated, filtered and formed, more particularly spun, into a product, such as continuous or staple yarn. One common procedure is to vertically stand a plurality of sheets of such cellulose in a batchwise manner, and immerse the sheets in an alkali hydroxide solution bath. Continuous steeping has also been proposed, either by immersion of shredded cellulose in alkali hydroxide solution and later expressing the excess solution from the steeped slurry product or by continuously applying or contacting or immersing sheet cellulose of indefinite length in a steeping spray or bath. Such processes or parts thereof are seen, for example, in U.S. Pat. Nos. 2,614,102—Schlosser et al, 2,499,010—Weeldenburg, 2,143,863—Collings et al and 2,149,178—Morton.

Following steeping it has been customary to age (mercerize) the alkali cellulose to bring about a depolymerization of the cellulose from a DP of 700-1000 to approximately 300-450, depending on the product to be made. Normally, the alkali cellulose is shredded and either collected in batches in cans, or treated continuously on belts or in towers for periods of time depending on the temperature and the catalysts present. Such periods of time have ranged from 20 to 80 hours.

It is known that catalysts such as iron, manganese, cobalt, salts, et cetera, catalyse the oxidation reaction and markedly reduce aging time. Similarly, higher temperatures and higher caustic content of alkali cellulose reduce aging time.

It has also been known that after mercerizing, the caustic content can be reduced by resteeping in a caustic solution of approximately 10-12%* sodium hydroxide, without adversely affecting its ability to form cellulose xanthate, and resulting in fewer by-products in the form of sulfur compounds being formed by the reaction of free excess sodium hydroxide with carbon disulfide. A process of this type is disclosed by Sihtola in U.S. Pat. Nos. 3,600,379 and 3,728,330.

*All solution concentrations are in percent, by weight.

It is the object of the present invention to provide an improved steeping and mercerizing process and apparatus for making alkali cellulose crumbs in a continuous, effective and efficient manner.

Previously disclosed processes for steeping and mercerizing continuously in sheet form always involved either low rates of through-put or very cumbersome and space-requiring means of mercerizing the continuous sheet prior to xanthation or to a second steeping followed by xanthation.

The process of the present invention provides for very rapid mercerizing so that continuous sheet steeping and mercerizing is a practical and economic operation.

It is therefore the general object of the present invention to provide an improved steeping-mercerization process and apparatus for making alkali cellulose in a continuous, effective and efficient manner.

More specifically, it is an object of this invention to provide an effective and efficient steeping method for uniformly converting indefinite lengths of sheet cellulose to the alkali cellulose form of desired degree of polymerization, ready for xanthation and spinning into a staple or continuous filamentary product.

These objects, and others which will be apparent in the course of the subsequent description of the invention, are met, briefly, by a process wherein sheet cellulose of indefinite length, and any desired width is passed first through a first stage steep at a rate of about 1 foot per second. The steep bath, which is on the order of 10-15 feet in length, consists of 17-25% alkali hydroxide solution. The caustic soda solution contains manganese or cobalt catalysts, or other chemical additives to accelerate mercerizing, and is in the normal steeping temperature range of 18°-50° C., preferably about 25° C. After steeping, excess solution is removed from the sheet by a series of pairs of nip rolls, each of which subjects the sheet to a successively greater pressure.

The pressures used are such as to give 3.2 to 2.6 press ratios. Press ratio is the weight ratio of pulp after pressing divided by the weight before steeping. Preferably also, a vacuum suction means is disposed just upstream of the nip roll pairs for removing excess solution expressed in the nip rolls.

The sheet then moves to the mercerizing chamber in which it is passed between electrodes subjecting it to electromagnetic (RF or microwave) energy at a frequency of $10^7$-$10^{11}$ hertz. This raises the temperature to bring about the desired degree of polymerization in a very short time, more specifically, about ½-4 minutes, and preferably about 2 minutes.

Following the mercerization, the alkali cellulose sheet can then proceed directly to the xanthation step, or it can proceed through a second steeping operation, similar in apparatus to the first steeping operation, in which it is treated with a catalyst-free, more dilute caustic solution (on the order of 8-15% sodium hydroxide) displacing a part of the excess free caustic soda, pressed to a press ratio of 3.0 to 2.4. It then is transferred to the xanthation stage.

Excess solution removed from the alkali cellulose product is recirculated to the steeping baths with the usual means of control of hemi-cellulose. These means for handling the sheet cellulose and passing it through the successive treatment steps may also include means for handling a plurality of indefinite length sheets of cellulose superposed over one another through the process. Means should also be included in the case of such superposed plurality of sheets to maintain such sheets in a spaced apart relation as they are immersed in and passed through each of the alkali hydroxide baths.

For a better understanding of the invention, reference should be made to the following detailed description thereof taken in conjunction with the appended claims, and the FIGURE, which is a diagrammatic illustration of the process and apparatus of the preferred form of the present invention.

Referring more specifically to the FIGURE, there is shown alternate cellulose pulp sheet supply rolls 1, 1a, with drive rolls 1b, 1c, supplying strips of pulp of indefinite length and any desired width, respectively over idler rolls 2, 2a and through feed roll pairs 3, 3a to a first alkali hydroxide steeping bath $S_1$, supported therein by endless guide belts 4 and 5, comprised of an open mesh glass or polypropylene fabric. Drive rolls 1b, 1c, feed roll pairs 3, 3a, and endless guide belts 4 and 5 are synchronized to convey the pulp sheet at a relatively constant velocity.

Preferably first stage steep bath $S_1$ is an 18-20% sodium hydroxide solution and the length of immersed sheet and its speed of travel is selected to provide an immersion time of 8-15 seconds. The nominal velocity of the pulp sheet is about 1 ft/sec and the length of travel in bath $S_1$ is about 10-15 feet. Leaving steep bath $S_1$, the sheet is supported by another open mesh belt 6 as it passes through a series of pairs of nip rolls 7, 8, and 9, the rolls of each pair being spaced and urged toward one another to exert succeedingly higher pressure on the sheet product to express solution therefrom without physically damaging the sheet. Generally, a progressively lower press ratio, in the range of 3.2 to 2.6, is used. One or more catch pans may be provided to recover drippings of excess alkali hydroxide from nip rolls 7, 8, and 9. Preferably, however, vacuum suction means V are provided upstream of one or more of each pair of nip rolls to remove excess alkali hydroxide expressed from the alkali cellulose strip passing therethrough. The excess alkali hydroxide solution recovered in this manner may be recirculated to the make-up stream for the steeping bath in a conventional manner.

The alkali cellulose sheet is then picked up by porous endless glass belt support 10 for mercerization. Mercerization may be promoted by introducing into the steep liquor of bath $S_1$ depolymerization accelerators, such as manganese and cobalt catalysts. An elevated temperature, on the order of 45° C., for example, may also be maintained to promote depolymerization in accordance with known methods. Mercerization or depolymerization is achieved rapidly by imparting energy to the cellulose in the form of electromagnetic radiation, or RF energy, from electrodes RFE, in a frequency range of $10^7$-$10^{11}$ hertz, and sufficient power to bring about the desired degree of polymerization during the time allowed in the mercerization stage. Other known methods of accelerating mercerization may be used in conjunction with RF energy.

Following RF depolymerization, some cooling stage may be required prior to xanthation. In the preferred form of this invention, this cooling is effected by the second steeping bath, which is maintained at a temperature selected to maintain optimum xanthation conditions (generally between 30° and 40° C.).

The partially depolymerized alkali cellulose sheet is then forwarded to a second steeping bath of alkali hydroxide solution (in the preferred form of the present invention). Bath $S_2$ comprises about 9-11% sodium hydroxide. Support belts 11 and 12 comprised of an open mesh woven glass or polypropylene fabric, are provided to forward the sheet material through the second steeping bath. The steeping time and excess solution removing means (13, 14, 15 and 16) in steeping bath $S_2$ are approximately the same as those in bath $S_1$. However, the final press ratio in nip rolls 16 may be as low as 2.4 to minimize excess caustic in the subsequent xanthation step.

Similar vacuum suction removal means V, as those described with respect to bath $S_1$ may be provided to recover excess alkali hydroxide and to recirculate or recover excess solution expressed from the alkali sheet by nip roll pairs 14, 15 and 16 and the vacuum pick-up.

The depolymerization process described herein, using RF energy, is preferably used in conjunction with a travelling sheet steeping process as described herein. However, this RF depolymerization may also be used in conjunction with other processes such as those in which the alkali cellulose is in crumb form.

While this invention has been described with respect to selected embodiments and examples, it should be understood that various minor modifications and adaptations of the process and apparatus of the present invention may be made without departing from the true spirit and scope thereof. For example, while this invention has been illustrated in an embodiment involving a single cellulose strip continuously fed through and treated in accordance with the apparatus and process of this invention, a plurality of such strips, superposed and spaced apart from one another, may also be utilized. Accordingly, the appended claims are intended to be construed to cover all such variations and adaptations of the invention which may be made by those skilled in the art without departing from the true spirit and scope thereof.

We claim:

1. An apparatus for mercerizing alkali cellulose comprising:
   a mercerizing chamber including means for generation of an RF energy field therein, and having means for subjecting said cellulose to mercerizing conditions including said RF energy field.

2. In an apparatus for mercerizing alkali cellulose, the improvement comprising a means for enhancing said mercerization process, said means adapted to impart RF energy to said alkali cellulose.

3. Apparatus for converting sheets of cellulose of indefinite length to alkali cellulose consisting of
   (a) a first bath of 17-25% alkali hydroxide solution, said bath being adapted to permit said sheet to be passed therethrough and immersed therein,
   (b) means for expressing excess solution from said cellulose sheet following immersion of said sheet in said first bath,
   (c) a mercerizing chamber and means therein for subjecting cellulose passing therethrough to mercerizing conditions including an RF energy field,
   (d) means for continuously supplying said cellulose sheet and forwarding it through said bath, while immersing it therein, through said mercerizing chamber and to said excess solution expressing means.

4. Apparatus, as recited in claim 3, wherein said excess solution expressing means consists of a series of pairs of nip rolls, the pressure between the rolls of the last of said pairs being higher than that in each of the preceding pairs of rolls and the pressure between the rolls in each of the preceding rolls being less than that of the next succeeding pair in said series, said pressures being selected to provide progressively lower press ratios, the final press ratio within the range 3.2 to 2.6.

5. Apparatus, as recited in claim 3, further including a second bath, said second bath consisting of 8-15% alkali hydroxide solution and being adapted to permit said sheet to be passed therethrough, following mercerization, and immersed therein.

6. Apparatus, as recited in claim 3, wherein said supply and forwarding means further include means for supplying and forwarding a plurality of superposed cellulose sheets, and for maintaining said sheets spaced apart from one another as they are passed through said alkali hydroxide baths.

* * * * *